US010302418B2

(12) United States Patent
Casagrande et al.

(10) Patent No.: US 10,302,418 B2
(45) Date of Patent: May 28, 2019

(54) INSPECTION GROUP OF AN ELONGATED ELEMENT

(71) Applicant: G.D S.p.A., Bologna (IT)

(72) Inventors: Alberto Casagrande, Castel Maggiore (IT); Sergio Morelli, Bologna (IT); Gilberto Spirito, Bologna (IT); Luca Federici, Bologna (IT)

(73) Assignee: G.D. S.p.A., Bologna (IT)

( * ) Notice: Subject to any disclaimer, the term of this patent is extended or adjusted under 35 U.S.C. 154(b) by 0 days.

(21) Appl. No.: 15/777,125

(22) PCT Filed: Nov. 17, 2016

(86) PCT No.: PCT/IB2016/056927
§ 371 (c)(1),
(2) Date: May 17, 2018

(87) PCT Pub. No.: WO2017/085662
PCT Pub. Date: May 26, 2017

(65) Prior Publication Data
US 2018/0328723 A1    Nov. 15, 2018

(30) Foreign Application Priority Data
Nov. 18, 2015   (IT) ........................ 102015000073240

(51) Int. Cl.
*G01B 11/24*    (2006.01)
*G01B 11/25*    (2006.01)
(Continued)

(52) U.S. Cl.
CPC ........ *G01B 11/2408* (2013.01); *A24C 5/3412* (2013.01); *G01B 11/245* (2013.01); *G01B 11/25* (2013.01)

(58) Field of Classification Search
CPC ................. G01N 21/952; G01N 21/89; G01N 2201/102; G01N 2021/8887;
(Continued)

(56) References Cited

U.S. PATENT DOCUMENTS 3,812,349 A * 5/1974 Gugliotta ............. A24C 5/3412
209/579
3,818,223 A * 6/1974 Gibson ................. A24C 5/3412
131/908
(Continued)

FOREIGN PATENT DOCUMENTS

| EP | 1901030 A2 | 3/2008 |
| EP | 1901031 A2 | 3/2008 |
| WO | 8300738 A1 | 3/1983 |

OTHER PUBLICATIONS

International Search Report and Written Opinion of the International Searching Authority Application No. PCT/IB2016/056927 Completed: Feb. 15, 2017; dated Feb. 24, 2017 12 pages.
(Continued)

*Primary Examiner* — Sang H Nguyen
(74) *Attorney, Agent, or Firm* — Whitmyer IP Group LLC

(57) ABSTRACT

An inspection group is proposed for inspecting cylinder-shaped elongated elements for smoking articles, in which a working plane is selected passing through a longitudinal axis of a first elongated element and there are considered a first half space and a second half space arranged on opposite parts with respect to the working plane. The inspecting group includes: a projecting device adapted to project a first stripe of light from the first half space onto an inspection portion of an external surface of the first elongated element and to obtain a first three-dimensional light trace, and also adapted to project a second stripe of light from the second half space onto the inspection portion to obtain a second three-dimensional light trace; an optical assembly adapted to frame the first elongated element and to process a first view and a second view; a processing device adapted to reconstruct a first closed curved section profile of the first elongated element processing an identified first curved light line in the first view and a second identified curved light line in
(Continued)

the second view and comparing the first reconstructed closed curved profile with an ideal section profile to identify possible deformations of the reconstructed first closed curved profile with respect to the ideal section profile. The projecting device includes a single projector of a single stripe of light; a shield, arranged between the single projector and the first elongated element, adapted to split the single stripe of light into a first part of a stripe of light and into a second part of a stripe of light; first deflectors of the first part of a stripe of light arranged in the first half space and second deflectors of the second part of the stripe of light arranged in the second half space to obtain respectively the first stripe of light projected from the first half space and the second stripe of light projected from the second half space by a single stripe of light.

18 Claims, 7 Drawing Sheets

(51) Int. Cl.
*A24C 5/34* (2006.01)
*G01B 11/245* (2006.01)

(58) Field of Classification Search
CPC ... G01B 11/245; G01B 11/105; A24C 5/3412; G06T 7/0006; G06T 2207/30108
See application file for complete search history.

(56) References Cited

U.S. PATENT DOCUMENTS

| | | | |
|---|---|---|---|
| 4,188,544 A | | 2/1980 | Chasson |
| 4,767,924 A | * | 8/1988 | Giebel ................. A24C 5/3412 250/223 R |
| 4,801,207 A | * | 1/1989 | Williams ............. G01B 11/245 348/135 |
| 5,245,409 A | * | 9/1993 | Tobar .................... G01B 11/25 348/88 |
| 5,404,023 A | * | 4/1995 | Neri ..................... A24C 5/3412 209/536 |
| 5,408,104 A | * | 4/1995 | Gorria .................... G01N 21/89 250/208.1 |
| 5,797,406 A | | 8/1998 | Dawson |
| 6,778,284 B2 | * | 8/2004 | Casagrande ............ B60M 1/28 356/614 |
| 9,013,697 B2 | * | 4/2015 | Kida .................... A24C 5/3412 250/559.01 |
| 2006/0109485 A1 | * | 5/2006 | Laemmel ............. A24C 5/3412 356/635 |
| 2007/0246053 A1 | * | 10/2007 | Grassmel ............... A24C 5/606 131/280 |
| 2011/0052039 A1 | | 3/2011 | Urabe et al. |

OTHER PUBLICATIONS

International Search Report and Written Opinion Application No. IT UB20155673 Completed: Jul. 28, 2016 9 pages.

* cited by examiner

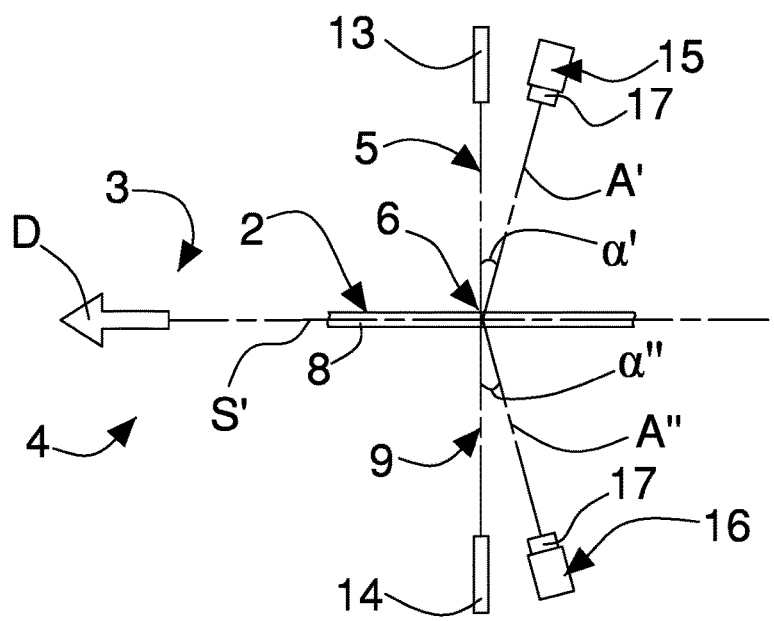
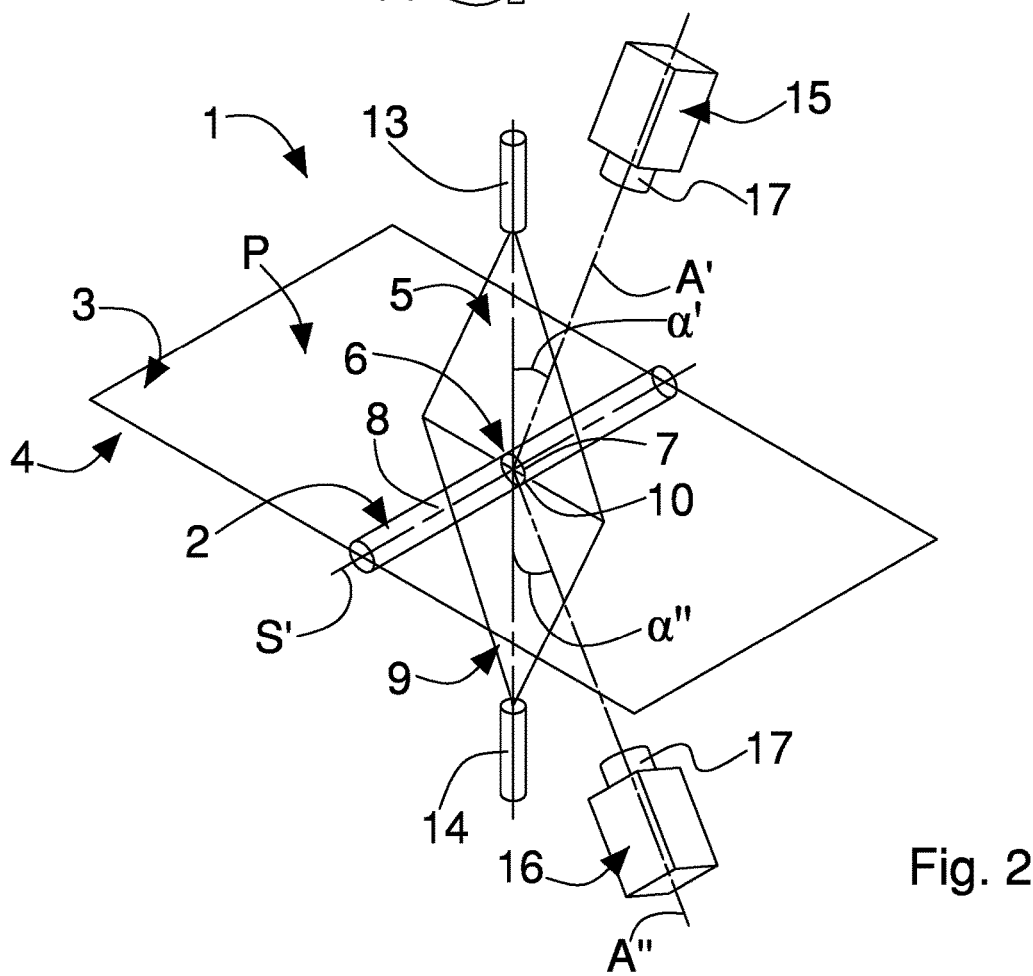

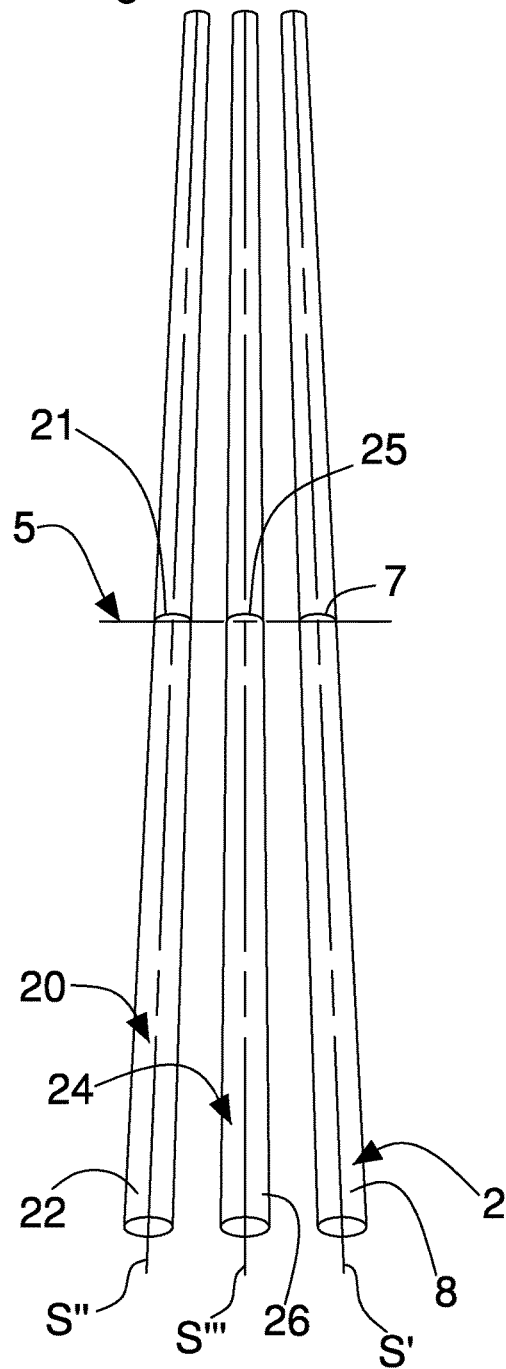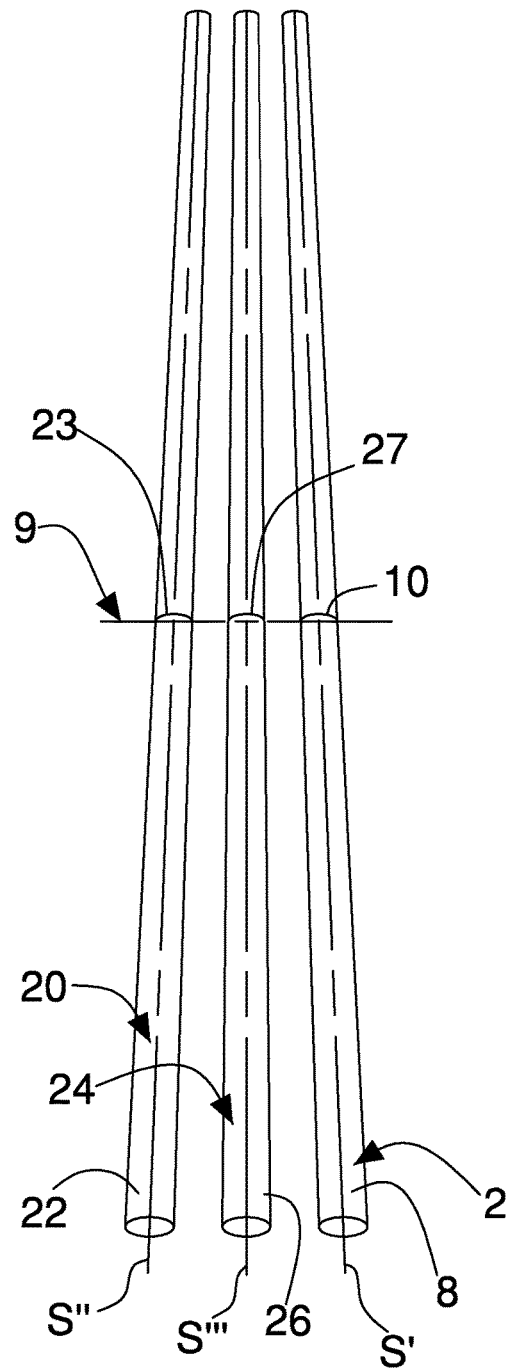

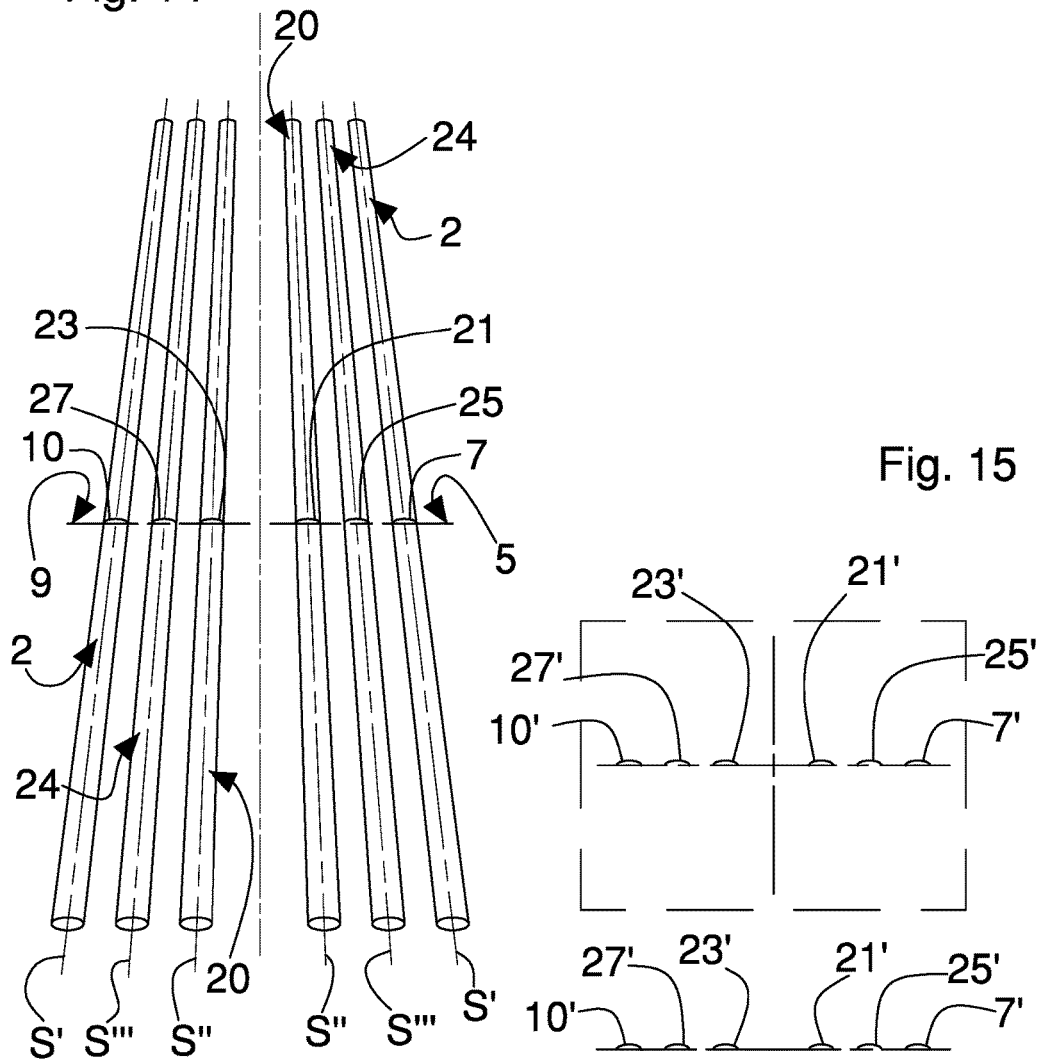
Fig. 14
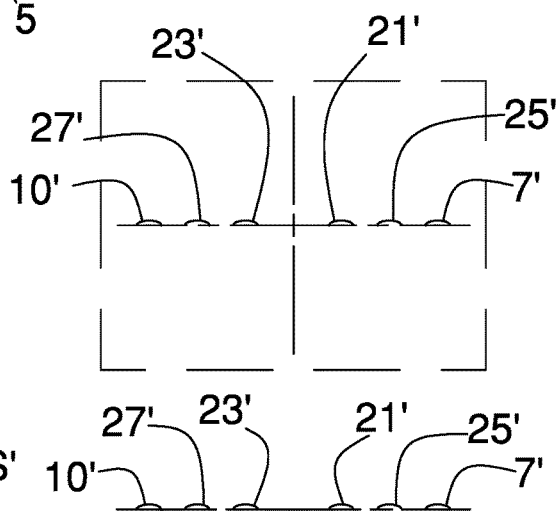
Fig. 15
Fig. 16
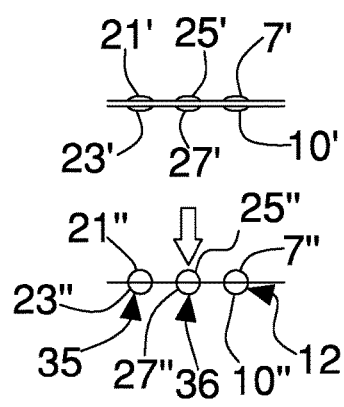
Fig. 17

INSPECTION GROUP OF AN ELONGATED ELEMENT

TECHNICAL FIELD

The present invention relates to an inspection group of an elongated element, in particular a rod-shaped elongated element, made of fibrous material in a machine of the tobacco industry.

BACKGROUND

In particular, the term "fibrous material" refers to fibres of filtering material (for example cellulose acetate) intended for forming a continuous filter rod in a single or double-line machine, for producing smoking articles such as filters of cigarettes, both alternatively to the fibres of tobacco intended for forming a tobacco rod in a single or double-line machine, to produce smoking articles such as cigarettes.

The rod-shaped elongated element can thus be a continuous filter rod, or a filter rod section or a piece of filter in a smoking article, or continuous tobacco rod, or a piece of a tobacco rod in a cigarette.

In particular the present invention relates to the inspection of a continuous rod containing fibrous material, such as fibres of tobacco or fibres of filtering material, to which the following discussion will refer explicitly without any loss of generality.

In order to make a continuous rod of fibrous material in the tobacco industry, supplying a continuous web of material is known, for example paper web material, to a forming beam that wraps the continuous web around a fibrous material deposited thereupon.

In particular, the continuous web is supplied to a forming apparatus, in particular the continuous web is supplied along a path in an advancement direction in contact with a belt conveyor to a forming beam, through a loading station at which the web receives the fibrous material deposited placed centrally thereupon. The forming beam comprises folding means, i.e. a variable-section groove, in which the belt conveyor and the continuous web engage to be deformed transversely, thus progressively wrapping the fibrous material and making a rod-shaped tubular wrapper.

A ribbon of adhesive material is arranged parallel to an end border of the continuous web on an inner surface of the latter to be brought into contact with an outer face of the tubular wrapper at the forming beam and, when stabilised by pressing means, make the continuous rod.

The continuous rod is advanced at the high operating speeds of current machines of the tobacco industry and is, as part of usual quality control procedures, inspected during advancement thereof before being supplied to a cutting device for cutting the continuous rod into pieces.

One known inspection method determines a diameter of the continuous rod at an inspection station, so that they can be optionally rejected, after cutting of the continuous rod into pieces, the pieces having a diameter that is different from that of a pre-set ideal diameter.

Typically, this inspection method is performed by an inspection group comprising pneumatic apparatuses that obtain the diameter of the rod, processing a difference between an air jet emitted transversely onto the rod and the pressure of the jet received after traversing of the rod. This pneumatic inspection is usually carried out in adjoining inspection portions along the entire extent of the tobacco rod.

In order to improve the aforesaid inspection method, an alternative inspection method and an alternative inspection group have been proposed, which enables not only the diameter of the continuous rod to be measured but also possible defects in the shape thereof, such as for example ovalness. This alternative inspection group is of optical type and is based on the acquisition, from several directions, of a plurality of shadows of the continuous rod that enable the shape of the continuous rod to be reconstructed in one inspection portion.

In order to detect the shape of the continuous rod, the inspection group comprises a plurality of inspection stations arranged along the longitudinal axis of the continuous rod, in each of which there is an optical assembly formed by an optical image acquisition apparatus and by an illuminator.

The expression "optical image acquisition apparatus" means an optoelectronic image acquisition apparatus, which is able to acquire images of an object, and in particular to process the images so as to extract features of interest from the images, for example geometric and/or shape features, of the object. The acquired images can be in colour or in black and white and from such images, information on the colour (tone, saturation etc) or respectively on the level of grey and on the light intensity can be extracted.

The optical apparatus usually comprises a body on which an electronic sensor is arranged, for example an alignment or array of photosensitive elements of linear or two-dimensional matrix type, for example of the CCD or CMOS type, and appropriate optical receiving means that is fixed to the body, for example an objective consisting of one or more lenses, by means of which the sensor is suitable for receiving the light diffused from the object to be acquired. The number of pixels or dot-shaped elements that make up the representation of a raster or bitmap image in the memory of the optical apparatus corresponds to the number of photosensitive elements of the electronic sensor. It should be noted that an image with resolution of (n*m) pixels can be obtained by single acquisition using a two-dimensional, or matrix, sensor of (n*m) photosensitive elements.

A control device is comprised in an optical apparatus for controlling the acquisition of the image, the switch-on of the illuminator and also, in some applications, for processing the acquired image in order to extract features of interest from the image and communicate the result of the optical inspection to an external control system. Optical apparatuses of this type are known as linear or matrix cameras, and if they are capable of processing the acquired image for analysing information of interest, they are also called "smart cameras".

The result of the optical inspection performed by the inspection group is communicated to an external control system, for example the control system of the cigarette packaging machine suitable for treating the pieces of continuous rod obtained after cutting, via a high speed data transmission communication network of the Ethernet type or other type. Alternative communication means can also be provided that is made by a set of digital input or output signals from the optical apparatus, connected to respective analogous digital output and input signals of the control system of the packaging machine.

The control system of the cigarette packaging machine is thus able to reject directly (or to communicate a defectiveness message to an outer device that performs the rejection operation) the inspected piece judged not to conform to the required quality requirements as soon as the piece reaches a rejection station.

In order to detect the shape of the continuous rod, each optical assembly is arranged at a different tilt with respect to the continuous rod, to illuminate from several directions the continuous rod and acquire from different directions partial shadow views projected therefrom. The different partial views acquired by the different optical apparatuses are processed to reconstruct a closed section profile of the continuous rod, the shape of which is analysed in order to extract the diameter and possible faults thereof, for example ovalness of the continuous rod. The inspection portion of the continuous rod thus extends for a segment comprised between the two partial end views.

The need for a plurality of optical assemblies has some drawbacks.

Owing to the plurality of necessary apparatuses, the cost of the inspection group is very high. Further, the inspection group has considerable overall dimensions because the optical apparatuses and the respective illuminators occupy a lot of space along the continuous rod.

Each inspection portion is thus extensive and this implies that at the high advancement speed of the rod, the shape of the continuous rod can be reconstructed with partial views that acquire segments of continuous rod that are also distant from one another along the longitudinal axis of the rod, which can cause great inspection imprecision.

In order to reduce the space occupied by the inspection group, it has been proposed to use a single optical apparatus and a single illuminator that are fixed to a support, the support being rotating with respect to the continuous rod, to acquire in succession during the rotation of the support the different shadows projected from different directions in respective partial views. The time necessary for a single inspection is high and also in this case, at the high advancement speeds of the rod, the shape of the continuous rod is reconstructed with partial views that are also very distant from one another.

It follows that an inspection group using a single rotating optical assembly may also be very imprecise, using partial views that are distant from one another in the rod to reconstruct the shape of the continuous rod.

US 2006/109485 discloses a method and an inspection group for inspecting rod-shaped articles of the tobacco industry by a plurality of stripes of light that project a respective plurality of light traces onto the article. A plurality of projectors of stripes of light are arranged around the article to be inspected and for each stripe of light a curved height profile is analysed by a respective sensor. The curved height profile is acquired by a PSD sensor, i.e. a sensor that is sensitive to position. Precision in reconstructing the rod-shaped article based on the shape of the curved profile thus depends on the respective arrangement of the projector and PSD sensor and thus on the distance between the PSD sensor and the elongated element.

If this arrangement differs from what is configured in a configuration step of the system, for example because of a size change of the inspected article that provides different positioning of one or more projectors of the stripes of light, it is necessary to configure again the position of each projector and of the respective sensor to solve above all the problems of overall dimensions constituted by the presence of projectors and of the corresponding optical apparatuses.

Additionally, the different light traces could be superimposed and thus the reconstruction of the profile might not be optimum, with imprecisions in the reconstruction of the section profile of the article.

SUMMARY

The object of the present invention is to provide an inspection group that is free of the drawbacks disclosed above or that, at the same time, is easy and cheap to use.

A further object of the present invention is to provide an inspection group that enables the shape of an elongated element for smoking articles to be detected, and has compact dimensions and reduced processing time for analysing an inspection portion along the longitudinal axis of the continuous rod that is as small as possible in such a manner as to ensure high measuring accuracy.

Another object of the present invention is to provide an inspection group that enables the shape of the continuous rod to be detected and is easy and cheap to make.

Another further object of the present invention is to provide an inspection group that enables light traces to be acquired that are projected onto the surface of the smoking article with great precision.

According to the present invention an inspection group is provided, according to what has been claimed in the appended claims.

BRIEF DESCRIPTION OF THE DRAWINGS

The present invention will now be disclosed with reference to the attached drawings that illustrate some embodiments thereof by way of non-limiting example, in which:

FIG. 1 is a schematic side view of an inspection group of an elongated element comprising an optical scanning assembly for three-dimensional scanning provided with a first optical apparatus for 3D profile, with a second optical apparatus for 3D profile and a projecting device comprising a first projector and a second projector of a respective first stripe of light and second stripe of light;

FIG. 2 is a schematic axonometric view of the inspection group of FIG. 1;

FIG. 5 shows a first view from the first half-space of the first elongated element, of the second elongated element and of the ideal elongated element, as framed by the first optical apparatus of FIG. 4, in which it is possible to identify in each elongated element a respective first curved line corresponding to the first three-dimensional light trace of FIG. 4;

FIG. 6 shows a second view from the second half-space of the first elongated element, of the second elongated element and of the ideal elongated element, as framed by a second optical apparatus, in which it is possible to identify in each elongated element a respective second curved line;

FIG. 14 shows the first view and the second view of the first elongated element, of the second elongated element and of the ideal elongated element, as framed by the first half-space and by the second half-space by the single optical apparatus of the FIGS. 11-13, in which in the first view, in each elongated element, respective first curved lines are identified whereas in the second view respective second curved lines are identified;

FIG. 15 shows the first identified curved lines and the second identified curved lines respectively in the first view and in the second view of FIG. 11, as acquired in a single image by the single optical apparatus of the FIGS. 11-13;

FIG. 16 shows the first identified curved lines and the second identified curved lines of FIG. 15 as processed for reconstructing a closed curved section profile of the first elongated element, of the second elongated element and of the ideal elongated element;

FIG. 17 shows the reconstruction of the closed curved section profile of the first elongated element, of the second elongated element and of the ideal elongated element, from the first identified curved lines and from the second identified curved lines of FIG. 16, arranged facing each other to define a closed section profile that is subsequently transformed perspectively;

DETAILED DESCRIPTION

In this description, similar elements being in common to the illustrated embodiments are shown with the same numbering.

As illustrated in FIGS. 1 to 18, with number 1 an inspection group of cylinder-shaped elongated elements for smoking articles is overall indicated.

The inspection group 1 can be for example integrated into a machine for making a continuous rod of fibrous material, for example containing fibres of tobacco or fibres of filtering material, of the tobacco industry and in this case the elongated element is a continuous filter rod or a continuous tobacco rod. The definition of "fibrous material" was provided previously and will not be repeated for the sake of brevity.

The inspection group 1 can also be advantageously integrated into a cigarette forming machine and in this case, as already illustrated in detail previously, the elongated element can be a piece of filter or a piece of a tobacco rod or a cigarette.

The inspection group is connected by communicating means (not shown) to the control apparatus (not shown) of the machine of the tobacco industry, typically, the machine control unit, to exchange data and/or commands with the control device. The inspection group can for example receive an inspection start command from the machine control apparatus and supply the inspection results to the control apparatus. Alternatively, the inspection group can activate independently the inspection of the elongated element and supply the inspection results to the control apparatus.

As said previously, the control apparatus can reject directly an inspected piece, judged not to conform to the requested quality requirements, as soon as the rod reaches a reject station, or can communicate the inspection result to the control system of a machine suitable for treating pieces obtained after cutting of a continuous rod.

Alternatively, advantageously, if the inspection group is integrated into the machine for making a continuous rod of fibrous material, the result of the optical inspection can be used to modify work operating parameters of the machine, for example to intervene at a pressure exerted by stabilising pressing means of the continuous rod.

Excessive pressure exerted by the pressing means during the stabilisation of an adhesive material present in the continuous rod can in fact lead to ovalisation of the rod itself. By detecting the shape of the continuous rod, in the event of non-conformity to the required quality requirements, a correction of the pressure exerted by the pressure means can be activated so as to return the shape of the continuous rod to what is desired.

Figure 18:
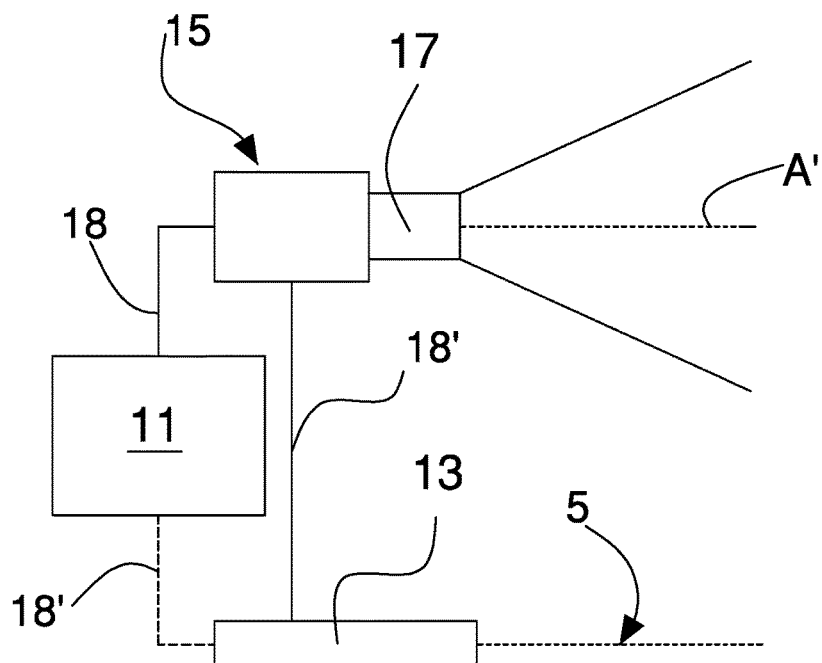
FIG. 18 shows a schematic view of a control system of the inspection group.
Figure 7:
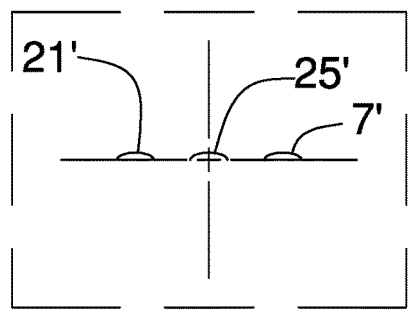
FIG. 7 shows the first identified curved lines in the first view of FIG. 5, as acquired in a first image.

In FIGS. 1 to 10, and in FIGS. 17 and 18, a first elongated element 2 is shown, for example a first tobacco rod, which has a longitudinal axis S'.

The inspection group 1 comprises a projecting device adapted to project from a first half-space 3 a first stripe of light 5 onto an inspection portion 6 of an external face 8 of the first elongated element 2 to obtain a first three-dimensional light trace 7 on said external face 8.

The projecting device is further adapted to project from a second half-space 4 a second stripe of light 9 onto the inspection portion 6 to obtain a second three-dimensional light trace 10 (FIG. 2) on the external face 8.

The first half-space 3 and the second half-space 4 are arranged on opposite parts with respect to a working plane P passing through the longitudinal axis S' of the first elongated element 2.

The inspection group 1 further comprises a three-dimensional optical scanning assembly, which is adapted to process a first view of the first elongated element 2, the first view being obtained by framing the first elongated element 2 from the first half-space 3, and is further adapted to identify in the first view a respective first curved line 7'.

The optical assembly is further adapted to process a second view of the first elongated element 2, the second view being obtained by framing the first elongated element 2 from the second half-space 4, and is further adapted to identify in the second view a respective second curved line 10'.

A three-dimensional optical scanning assembly is based on the principle that if a stripe of light illuminates a surface, the reflected line is a straight line if the illuminated surface is flat; is a curved line, in the presence of concavities or convexities; is a broken line in the presence of an edge. If the surface illuminated by the stripe of light is a surface in space, the reflected line is a mixed broken line, with rectilinear segments, curvilinear portions and broken lines.

The inspection group 1 comprises a processing device 11 (FIG. 18), adapted to reconstruct a first closed curved section profile 12 of the first elongated element 2 by processing the first identified curved line 7' in the first view (corresponding to the first three-dimensional light trace 7 on the external face 8 of the first elongated element 2) and the second identified curved line 10' in the second view (corresponding to the second three-dimensional light trace 10 on the external face 8 of the first elongated element 2), as shown in FIG. 17. Further, the processing device 11 is adapted to compare the reconstructed first closed curved profile 12 with a section profile 36 of an ideal elongated element 24 (shown in FIG. 4), i.e. with an ideal section profile, in order to identify possible deformations of the reconstructed first closed curved profile 12 with respect to the ideal section profile.

By means of the reconstructed first closed curved profile 12, it is possible to check a shape of the first elongated element 2, to ascertain a possible defect therein such as for example a possible ovalness of the continuous rod.

In addition to the check of the shape, the processing device 11 is also adapted to calculate from the reconstructed first closed curved profile 12 also a diameter of the cross section of the first elongated element 2, usable in association with the shape of the first elongated element 2 for possible standard checks on the first elongated element 2.

The projecting device comprises a first projector 13, which is adapted to project the first stripe of light 5 from the first half-space 3 and a second projector 1 adapted to project the second stripe of light 9 from the second half-space 4.

The optical assembly further comprises a first 3D profile optical apparatus 15 adapted to acquire a first image of the first view and a second 3D profile optical apparatus 16 adapted to acquire a second image of the second view.

Each 3D profile optical apparatus, i.e. the first optical apparatus 15 or the second optical apparatus 16, comprises a respective objective 17 adapted to frame the first elongated element 2 in the inspection portion 6 when the first elongated element 2 is advanced in a direction D (FIGS. 1 and 3) and is within the field of view of the optical apparatus. In each optical apparatus 15, 16, with A' and A", the respective optical axes are indicated.

It is pointed out that a field of view is defined as an acquisition field of the optical apparatus 15, 16, i.e. a pre-set area inside which the images of the first elongated element 2 can be acquired, which is inside a focusing range and for which, along the optical axis A', A" of the objective 17 it is possible to define a pre-set depth of field.

It is pointed out that each optical apparatus 15, 16, is for a 3D profile inasmuch as it has operating parameters, such as for example a diaphragm aperture, a focal length or a zoom, which are set in such a way that the respective three-dimensional light trace 7, 10 on the external face 8 of the first elongated element 2 is distinctly identifiable with respect to the external face 8, when the respective curved line 7', 10' is identified and acquired in the respective first image and second image. For example, the first three-dimensional light trace 7 and the second three-dimensional light trace 10 are identifiable as curved lines 7', 10' inasmuch are they are distinct and clear in an image the background of which is dark, as shown schematically in FIGS. 7 and 8.

The first optical apparatus 15 and the second optical apparatus 16, further comprise a respective control device (not shown), for commanding an acquisition of the first image or of the second image and in addition switching on the respective first projector 13, second projector 14 associated therewith. Each control device of the optical apparatus 15, 16 can also be made and configured so as to process the first image or the second image acquired in order to define respectively the first curved line 7' and the second curved line 10'.

Alternatively and/or additionally, the processing device 11 can be adapted to command in each optical apparatus 15, 16 acquisition of the images, or switching on of the projector 13, 14 of the stripe of light 5, 9 and also processing of the respective images acquired by the optical apparatuses 15, 16, in order to identify respectively the first curved line 7' in the first image or the second curved line 10' in the second image. In the latter case, if the processing device 11 is configured for image-processing, the control device of each optical apparatus 15, 16 can be simpler, having only functions of image acquisition and control of the respective projector 13, 14 of the stripe of light.

It should be noted that, as illustrated schematically in FIG. 18, the first optical apparatus 15 and the processing device 11 are connected together by a communication network 18, for example of the Ethernet cable type or WIFI, which further connects, even if it is not illustrated, the processing device 11 and the second optical apparatus 16.

The first projector 13 is on the other hand connected preferably directly to the first optical apparatus 15 by respective digital input/output signals 18' that can be provided optionally, as illustrated by the dashed lines, also between the processing device 11 and the first projector 13.

Digital input/output signals are provided, similarly but not illustrated, also for connecting the second projector 14 to the second optical apparatus 16.

Each 3D profile optical apparatus 15, 16 has to be arranged in a suitable manner with respect to the respective stripe of light 5, 9 and with respect to the elongated element 2, so that the inspection can take place. In detail, the first optical apparatus 15 has to be positioned in such a manner that the optical axis A' thereof does not lie on the plane of the respective first stripe of light 5 but instead forms a first angle α' comprised between 10° and 80°, preferably between 30° and 60°, with respect to the plane on which the first stripe of light 5 lies. Similarly, between the optical axis A" of the second optical apparatus 16 and the respective stripe of light 9 a second angle α" has to be present.

For example, by arranging the first projector 13 and the second projector 14 respectively in the first half-space 3 and in the second half-space 4 so as to project the respective stripe of light 5, 9 orthogonally to the longitudinal axis S' of the first elongated element 2, as shown in the attached figures, it is not possible to arrange the optical axis A' of the first optical apparatus 15 or the optical axis A" of the second optical apparatus 16 orthogonally with respect to the first elongated element 2, on the same plane on which the first stripe of light 5 and the second stripe of light 9 respectively lie.

In other words, each optical apparatus 15, 16 has to be tilted with respect to the respective stripe of light 5, 9 so that respectively the first three-dimensional light trace line 7 and the second three-dimensional light trace 10 can outline the shape of the first elongated element 2.

The first angle α' defined between the first optical apparatus 15 and the respective first stripe of light 5 can also, for reasons of assembly or of space available along the longitudinal axis of the elongated element 2, be slightly different from the second angle α" between the second optical apparatus 16 and the respective second stripe of light 9. The elongated element 2 can be viewed from slightly different directions in the first view or in the second view but this does not compromise the reconstruction of the first closed curved section profile, as will be seen better below.

The inspection portion 6 is formed by the longitudinal segment of elongated element 2 between the first three-dimensional light trace 7 and the second three-dimensional light trace 10.

In FIG. 1, it should be noted that the inspection portion 6 substantially coincides with an inspection cross section, as the first stripe of light 5 and the second stripe of light 9 lie substantially on the same plane, which is in particular perpendicular to the longitudinal axis S' of the first elongated element 2.

In order to prevent the first stripe of light 5 being able to disturb acquisition by the second optical apparatus 16 of the second three-dimensional light trace 10 that is obtained by projecting the second stripe of light 9 onto the elongated element 2, the first stripe of light 5 can be optionally at a different moment with respect to the second stripe of light 9 be emitted, and the first view and the second view can be acquired in succession, i.e. staggered over time.

Alternatively, according to a version that is not illustrated, the first stripe of light 5 and the second stripe of light 9 can lie on different planes and thus the inspection portion can extend in a non-nil portion of the first elongated element 2. The first view and the second view can, in this case, also be acquired simultaneously but staggered in space.

The projecting device can comprise a deflector (not shown), for example a mirror, of the first stripe of light 5 and/or a deflector (not shown) of the second stripe of light 9, arranged in such a manner as to project the first stripe of light 5 from the first half-space 3 and the second stripe of light 9 from the second half-space 4 however the first projector 13 and the second projector 14 are arranged with respect to the first elongated element 2.

The deflector of the first stripe of light 5 and/or of the second stripe of light 9 can be used for positioning in space in a suitable manner the first projector 13 and possibly optionally the second projector 14 with respect to the mechanical members of the machine for tobacco, to project as desired the first stripe of light 5 and the second stripe of light 9, also in the presence of problems of overall dimensions of the optical assembly that are not otherwise solvable.

Even in the presence of the deflectors of the first stripe of light 5 and/or of the second stripe of light 9, the first angle α' has to be present between the optical axis A' of the first optical apparatus 15 and the plane on which the first stripe of light 5 lies and further optionally also the second angle α" has to be present between optical axis A" of the second optical apparatus 16 and the plane in which the second stripe of light 9 lies. What was said previously for the size of the angles α' and α" applies, which angles can also be slightly different.

Figure 3:
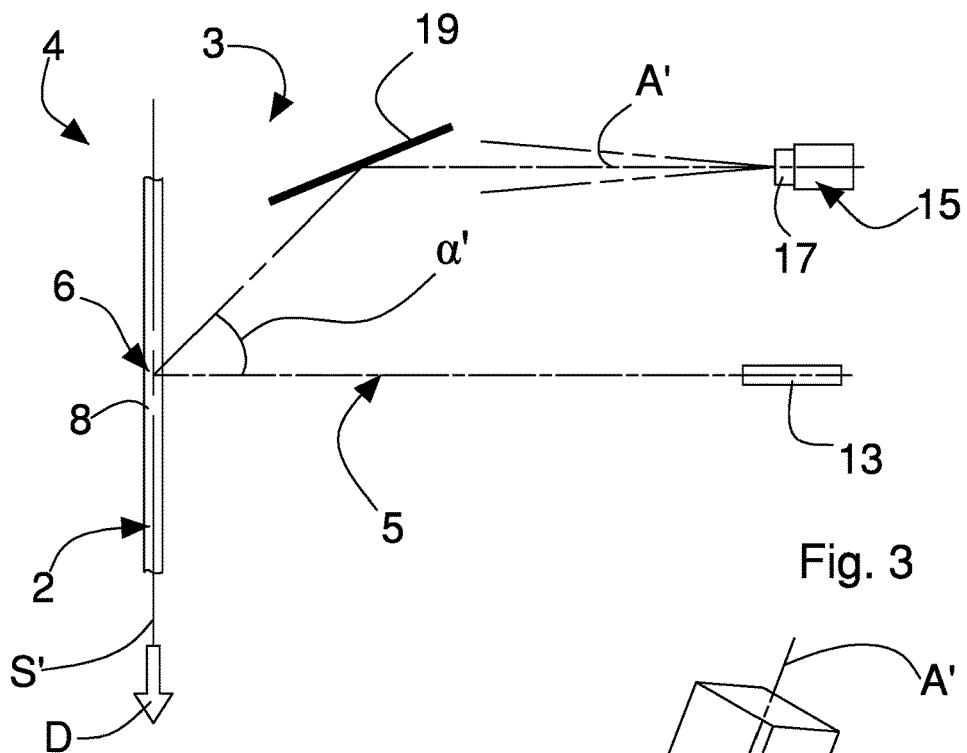
FIG. 3 is an incomplete schematic side view of an embodiment of the inspection group of FIG. 1, in which the first optical apparatus is suitable for acquiring a first view of the elongated element through a deflector that is adapted to generate a virtual mirror plane of the elongated element, the second optical apparatus and the second projector having been omitted for the sake of clarity.

Optionally, as shown in FIG. 3, the optical assembly can comprise a deflector 19 of the first view and/or a deflector (not shown) of the second view, arranged in such a manner as to generate a virtual mirror plane of the first view and/or of the second view, such that the first optical apparatus 15 may acquire the first view from the deflector 19 of the first view and/or the second optical apparatus 16 can acquire the second view from the deflector of the second view, regardless of the arrangement of the first optical apparatus 15 and the second optical apparatus 16 with respect to the first elongated element 2.

Also in this case, the deflector 19 of the first view and possibly the deflector of the second view can be used for positioning in space in a suitable manner the first optical apparatus 15 and optionally the second optical apparatus 16 with respect to the mechanical members of the machine for tobacco, ensuring correct acquisition of the first view and of the second view also in the presence of problems of overall dimensions of the optical assembly that are not otherwise solvable.

Again, also in the presence of the deflector of the first view 19 and/or of the deflector of the second view, the first angle α' and the second angle α" have to be present between the optical apparatus 15, 16 and the respective stripe of light 5, 9, according to what has been said previously.

According to a version shown in FIGS. 4 to 10, the inspection group 1 is adapted to inspect simultaneously the first elongated element 2 and a second elongated element 20, during an advancement thereof, by the first stripe of light 5 and the second stripe of light 9.

The projecting device is adapted to project the first stripe of light 5 from the first half-space 3 onto an external face 22 of the second elongated element 20 to obtain a first three-dimensional light trace 21 on said external face 22.

The projecting device is further adapted to project the second stripe 9 from the second half-space 4 onto the external face 22 to obtain a second three-dimensional light trace 23 on the external face 22.

The first elongated element 2 and the second elongated element 20 are arranged alongside one another, respectively in a first position and in a second position, and the longitudinal axis S' of the first elongated element 2 and a longitudinal axis S" of the second elongated element 20 are arranged in the working plane P.

Preferably, the first elongated element 2 and the second elongated element 20 are arranged parallel to one another, i.e. the longitudinal axis S' of the first elongated element 2 and the longitudinal axis S" of the second elongated element 20 are parallel to one another.

If the first view is obtained by framing simultaneously the first elongated element 2 and the second elongated element 20 from the first half-space 3 and if the second view is obtained by framing simultaneously the first elongated element 2 and the second elongated element 20 from the second half-space 4, the optical assembly is adapted to process the first view and identifying additionally in the first view a first curved line 21' (corresponding to the first three-dimensional light trace 21 on the external face 22 of the second elongated element 20) and for processing the second view and identifying additionally in the second view a second curved line 23' (corresponding to the second three-dimensional light trace 23 on the external face 22 of the second elongated element 20).

It is pointed out that the first elongated element 2 and the second elongated element 20 could also not be parallel to one another, for example in a particular arrangement of the forming machine for forming a continuous rod of cigarette, provided that both are inspectable simultaneously by the first stripe of light 5 and by the second stripe of light 9 both being framed by the first view and by the second view.

The processing device 11 is adapted to reconstruct additionally a second closed curved section profile 35 of the second elongated element 20, by processing the first identified curved line 21' in the first view and the second identified curved line 23' in the second view, and comparing the second reconstructed closed curved profile 35 with the ideal section profile, to identify in addition possible deformations of the second closed curved profile 35 with respect to the ideal section profile.

Advantageously, as shown in FIGS. 4 to 10, alternatively or additionally, the inspection group 1 can inspect simultaneously the first elongated element 2 and also an ideal elongated element 24 by the first stripe of light 5 and the second stripe of light 9.

The first elongated element 2 and the ideal elongated element 24 also have to be arranged alongside one another, respectively in a first position and in a reference position, such that the longitudinal axis S' of the first elongated element 2 is parallel to a longitudinal axis S''' of the ideal elongated element 24 and both the longitudinal axes S', S''' are arranged in the working plane P.

The projecting device is further adapted to project the first stripe of light 5 from the first half-space 3 on an external face 26 of the ideal elongated element 24 to obtain a first three-dimensional light trace 25 on said external face 26.

The projecting device is further adapted to project the second stripe from the second half-space 4 onto the external face 26 of the ideal elongated element 24 to obtain a second three-dimensional light trace 27 on the same external face 26.

If the first view is obtained by framing simultaneously the first elongated element 2 and the ideal elongated element 24 from the first half-space 3, the second view is obtained by framing simultaneously the first elongated element 2 and the second elongated element 20 by the second half-space 4, the optical assembly is adapted to process the first view and identifying additionally in the first view a first curved line 25' (corresponding to the first three-dimensional light trace 25 on the external face 26 of the ideal elongated element 24) and for processing the second view and identifying additionally in the second view a second curved line 27' (corresponding to the second three-dimensional light trace 27 on the external face 26 of the ideal elongated element 24).

Preferably, the first elongated element 2 and the ideal elongated element 24 are arranged parallel to one another, in other words the longitudinal axis S' of the first elongated element 2 is parallel to the longitudinal axis S''' of the ideal elongated element 24.

Nevertheless, as already said previously, also in this case the first elongated element 2 and the ideal elongated element 24 could not be parallel to one another, provided that both can be inspected simultaneously by the first stripe of light 5 and by the second stripe of light 9, being both framed by the first view and by the second view.

The processing device 11 is adapted to reconstruct additionally also the closed curved section profile of the ideal elongated element 24, by processing the first identified curved line 25' in the first view and the second identified curved line 27' in the second view, in order to monitor said reconstructed closed curved profile of the ideal elongated element 24, during an operating step of an inspection method, generating a warning if the reconstructed closed curved section profile of the ideal elongated element 24 is different from the ideal section profile 36.

If, in fact, the reconstructed closed curved section profile 36 of the ideal elongated element 24 is different from the ideal section profile, despite the inspecting of an ideal elongated element 24, there would be a defect during the operating step of the inspection. For example, because of a shock or a vibration, the first angle α' or the second angle α" between the optical apparatus 15, 16 and the respective stripe of light 5, 9 could have altered over time and thus processing of the first view and of the second view would no longer be correct.

The corresponding arrangement between the stripe of light 5, 9 and the corresponding optical apparatus 15, 16, i.e. the geometry of the optical assembly, is established a priori during the step of designing the inspection group and corresponds to a reference arrangement.

The defect recorded during the operating step of the inspection indicates that the reference arrangement of the inspection group, established during the design step, is no longer valid and thus the inspection is no longer reliable.

The warning can generate a request for intervention by an operator, to configure for example again the arrangement of the inspection group according to the reference arrangement, i.e. according to the geometry of the optical assembly established a priori.

Alternatively, the warning could require the need to modify processing of the first view and of the second view to consider the new geometry of the optical assembly, as will be seen in detail below, i.e. the inspection method could configure itself.

Figure 4:
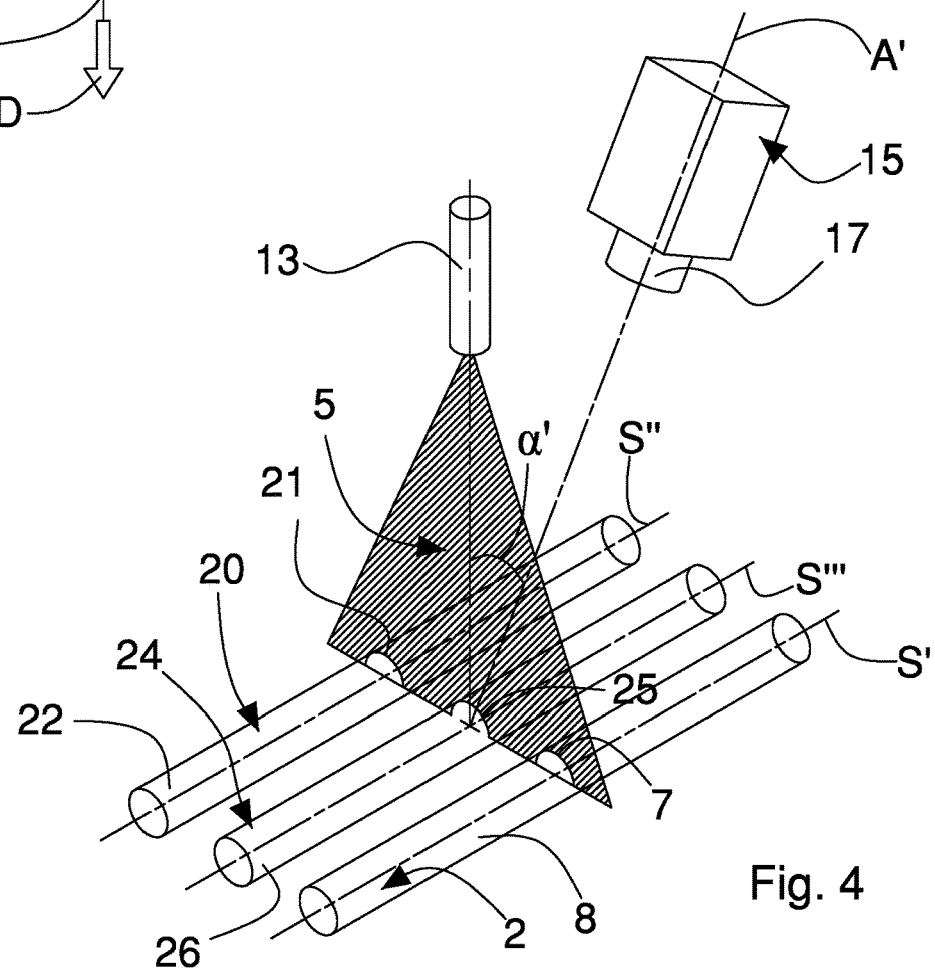
FIG. 4 is an incomplete schematic axonometric view of another embodiment of the inspection group of FIG. 1, comprising an optical assembly for inspecting simultaneously a first elongated element, a second elongated element and an ideal elongated element, in which the second optical apparatus and the second projector have been omitted for the sake of clarity and in which a first stripe of light is projected onto each elongated element to obtain, on the external face of each elongated element, a respective first three-dimensional light trace.

If, as illustrated in FIG. 4 the first elongated element 2, the second elongated element 20 and also the ideal elongated element 24 are present arranged alongside one another, preferably arranged parallel to one another, the inspection group is adapted to inspect all three, if the optical assembly is adapted to frame simultaneously (FIGS. 5 and 6) in the first view from the first half-space 3 and in the second view by the second half-space 4 the first elongated element 2 arranged in the first position, the second elongated element 20 arranged in the second position and the ideal elongated element 24 arranged in the reference position. The ideal elongated element 24 is interposed, for example, between the first elongated element 2 and the second elongated element 20.

The inspection occurs simultaneously for the first elongated element 2 and for the second elongated element 20, whilst the ideal elongated element 24 is used to monitor positioning in the operating step of the optical apparatus 15, 16 and of the respective projector 13, 14.

The presence of the first elongated element 2 and of the second elongated element 20 usually occurs in a machine of the tobacco industry, for example a machine for forming a double continuous tobacco rod, in which a first rod is formed parallel to a second rod. The ideal elongated element 24 can be arranged advantageously parallel to the first and to the second rod, therebetween.

In use, the inspection group 1 receives an inspection start command from the machine control apparatus or activates independently, according to a pre-set inspection logic, inspecting of the elongated element.

A working plane P is selected that passes through a longitudinal axis S of a first elongated element 2, typically a horizontal working plane P, and in this manner there are considered a first half-space 3, corresponding for example to an upper half-space if the working plane P is horizontal, and a second half-space 4, for example a lower half-space, arranged on opposite parts with respect to the working plane P.

In an operating step, the inspection method comprises the step of projecting a first stripe of light 5 from the first half-space 3 onto an inspection portion 6 of an external face 8 of the first elongated element 2 to obtain a first three-dimensional light trace 7 and further comprises the step of projecting a second stripe of light 9 from the second half-space 4 onto the inspection portion 6 of the first elongated element 2 to obtain a second three-dimensional light trace 10.

The method further comprises the step of framing the first elongated element 2 from the first half-space 3 and obtaining a first view; processing the first view to identify in the inspection portion a first curved line 7'; framing the first elongated element 2 from the second half-space 4 and obtaining a second view; processing the second view to identify in the inspection portion 6 a second curved line 10'.

By processing the first identified curved line 7' and the second identified curved line 10', the inspection method provides the step of reconstructing a first closed curved section profile 12 of the first elongated element 2 and of comparing the reconstructed closed curved profile 12 with a closed curved section profile 36 of an ideal elongated element 24, i.e. with an ideal section profile like for example a circular profile, to identify possible deformations of the reconstructed first closed curved profile 12 with respect to the ideal section profile.

The inspection results are provided to the machine control apparatus, as disclosed previously.

As illustrated in FIG. 17, if the first elongated element 2 is arranged in a first position, to reconstruct the first closed curved profile 12 the first identified curved line 7' and the second identified curved line 10' are arranged facing opposite, by rotating or overturning for example the second identified curved line 10' by 180°, and a first geometric transformation is applied to the first identified curved line 7' and to the second identified curved line 10' that face opposite. The closed curved section profile is further reconstructed by using a perspectively corrected first curved line 7" and a perspectively corrected second line 10".

According to one version, which is not illustrated, of the inspection method, for reconstructing the first closed curved section profile 12 the first geometric transformation is applied to the first identified curved line 7' and to the second identified curved line 10'. By arranging the perspectively corrected first curved line 7" and the perspectively corrected second line 10" facing opposite, the latter for example rotated or overturned by 180°, the first closed curved profile 12 is thus reconstructed.

If the reconstructed first closed curved profile 12 is deformed with respect to the ideal section profile, for example the first reconstructed curved profile 12 has an oval and non-circular profile, and the detected deformation exceeds a threshold deformation, the inspection portion is declared to be defective, or anyway non-conformant to a required quality.

It is pointed out that some cigarette format sizes have an oval and non-circular cross section. In this case the inspection portion will be declared to be defective, or anyway non-conformant to a required quality, if a circular and non-oval section profile is detected.

Figure 8:
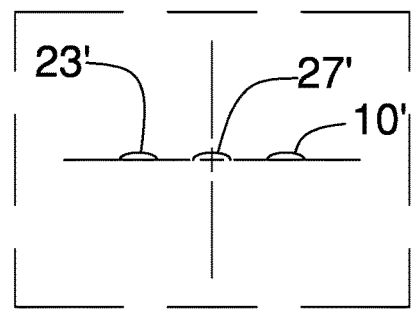
FIG. 8 shows the second identified curved lines in the second view of FIG. 6, as acquired in a second image.
Figure 9:
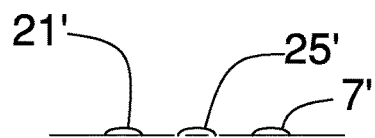
FIG. 9 shows the first curved lines of FIG. 7, processed for reconstructing a closed curved section profile of the first elongated element, of the second elongated element and of the ideal elongated element.
Figure 10:
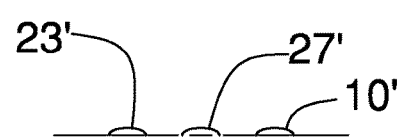
FIG. 10 shows the second curved lines of FIG. 8, processed for reconstructing a closed curved section profile of the first elongated element, of the second elongated element and of the ideal elongated element.

The inspection method comprises providing a projecting device of the first stripe of light 5 and of the second stripe of light 9, which comprises a first projector 13 and a second projector 14, to generate respectively the first stripe of light 5 and the second stripe of light 9 and project the first stripe of light 5 and the second stripe of light 9 respectively from the first half-space 3 and from the second half-space 4. The first 3D profile optical apparatus 15 and the second 3D profile optical apparatus 16 of a three-dimensional optical scanning assembly are also provided to acquire respectively a first image of the first view (FIG. 7) and a second image of the second view (FIG. 8).

As indicated previously, it was said that between each optical apparatus 15, 16 and respective stripe of light 5, 9 a first angle α' and a second angle α" must be respectively formed, each comprised between 10° and 80° preferably between 30° and 60°, so that the inspection can take place. In other words each optical apparatus 15, 16 has to be arranged tilted with respect to the respective stripe of light 5, 9.

Accordingly, the first three-dimensional light trace 7 in the first view and the second three-dimensional light trace 10 of the second view, acquired respectively in the first image from the first optical apparatus 15 and in the second image from the second optical apparatus 16, are distorted by the perspective view point.

Further, the difference between the first angle α' and the second angle α" could introduce small variation in the observation point of the elongated element 2, to be considered at the moment of the reconstruction of the closed curved section profile 12.

The perspective distortion of the curved lines 7', 10' that are identified in the acquired images would make the image recognition and decoding algorithms much more complex and less efficient, with consequently lengthy times for processing and decoding the images. Further, the distortion could introduce errors into the evaluation of the first closed curved section profile 12, which is reconstructed using the identified curved lines 7', 10'. For this reason, it is advantageous to transform geometrically the acquired image, by means of an algorithm that returns the image to the actual and non-distorted proportions, so as to extract features of interest of the closed curved section profile of the elongated element from the transformed image and not from the acquired image.

This algorithm, defined conventionally as a geometric transformation, is based on the hypothesis that each point of the distorted image is correlatable with a corresponding point of the actual image. The algorithm needs coordinates of certain suitably selected points, which are to be identified in the distorted image and in the transformed image, to be able to be defined.

It will be seen below how the present invention defines the first geometric transformation, introduced previously.

The inspection method can provide for inspecting simultaneously the first elongated element 2, in a first position, and optionally a second elongated element 20, in a second position by the first stripe of light 5 and the second stripe of light 9, as already illustrated previously and not repeated here for the sake of brevity, by projecting the first stripe of light 5 and the second stripe of light 9 on to the second elongated element 20 in order to reconstruct a second closed curved section profile 35 of the second elongated element 20.

By comparing the second reconstructed closed curved profile 35 with the section profile 36 of the ideal elongated element 24, it is possible to identify additionally possible deformations of the second reconstructed closed curved profile 35 with respect to the ideal section profile.

Alternatively or additionally, the method provides the step of arranging an ideal elongated element 24 alongside the first elongated element 2, respectively in a reference position and in the first position such that the longitudinal axis S' of the first elongated element 2 and a longitudinal axis S''' of the ideal elongated element 24 are both arranged in the working plane P. The method further provides the step of inspecting simultaneously the first elongated element 2 and also the ideal elongated element 24 by the first stripe of light 5 and the second stripe of light 9.

By obtaining from the projection of the first stripe of light 5 a first three-dimensional light trace 25 on an external face 26 of the ideal elongated element 24, and obtaining from the projection of the second stripe of light 9 a second three-dimensional light trace 27 on the external face 26 of the ideal elongated element 24, the method further comprises the step of framing simultaneously from the first half-space 3 the first elongated element 2 and the ideal elongated element 2, so as to process the first view to identify additionally a first curved line 25' of the ideal elongated element 24, and framing simultaneously from the second half-space 4 the first elongated element 2 and the ideal elongated element 24 such as to process the second view to identify additionally a second curved line 27' of the ideal elongated element 24.

For monitoring the reconstructed closed curved profile of the ideal elongated element 24, the inspection method provides the step of reconstructing a closed curved section profile of the ideal elongated element 24, by processing the first identified curved line 25' and the second identified curved line 27', generating a warning if the reconstructed closed curved profile of the ideal elongated element 24 is different from the ideal section profile 36.

If, in fact, the reconstructed closed curved profile is not for example circular, it is clear that a defect has occurred, as said previously, during the operating step of the inspection.

By setting up the first elongated element 2 and the ideal elongated element 24, and optionally the second elongated element 20, and framing simultaneously, both in the first view and in the second view, the first elongated element 2 arranged in the first position, the ideal elongated element 24 arranged in the reference position and also optionally the second elongated element 20 arranged in the second position, it is possible to inspect simultaneously the first elongated element and also optionally the second elongated element, checking during an operating step of the inspection that also the inspection group operates correctly as at the moment of installation.

It has been said previously that, if the arrangement of the inspection group is no longer the reference arrangement, a warning can be generated to request the intervention of an operator or the new arrangement can be considered to be the new reference arrangement and the inspection method can thus configure itself.

The auto-configuration of the inspection method is connected to a calibration step of the inspection method.

As said previously, the inspection method of the present invention defines the first geometric transformation and, to do that, a step of configuring or calibrating the inspection group 1 is provided, prior to the operating step, so as to be able to define in this step the first geometric transformation to be applied subsequently during the operating step of the inspection.

The step of calculating in the calibration step, preceding the operating step, the first geometric transformation applied during the operating step, using an ideal elongated element 24, provides arranging the ideal elongated element 24 instead of the first elongated element 2 in the first position and inspecting the elongated element 24 itself, by projecting the first stripe of light 5 and the second stripe of light 9.

Similarly to what has been said previously, the first view of the ideal elongated element 24 framed by the first half-space 3 is processed to define a first curved line 25', corresponding to a first three-dimensional light trace 25 obtained in the external face 26 of the ideal elongated element 24, and the second view of the ideal elongated element 24 is also processed, which is framed by the second half-space 4 to define a second curved line 27', corresponding to a second three-dimensional light trace 27 obtained in the external face 26.

Subsequently, between the possible processing modes, the specific processing mode is selected that is able to transform geometrically the first identified curved line 25' and the second identified curved line 27' reconstructing the ideal section profile, or a circumference, and this specific processing mode is selected as a first geometric transformation.

The method further comprises optionally, in the calibration step, the step of calculating the first geometric transformation associated with the first position and in addition a second geometric transformation associated with the second position, using the ideal elongated element 24 and arranging the latter instead of the second elongated element 20 in the second position, to inspect in the operating step the first elongated element 2 and the second elongated element 20 by applying respectively the first geometric transformation to the first elongated element 2 and the second geometric transformation to the second elongated element 20.

Although the first geometric transformation can be used to reconstruct the section profile of both the first elongated element 2 and of the second elongated element 20, there is advantageously greater precision in the reconstruction of the respective closed section profile if a different geometric transformation is selected for each position.

Additionally to the first geometric transformation, and optionally to the second geometric transformation, in the calibration step the inspection method also calculates the reference geometric transformation associated with the reference position, using the ideal elongated element 24 that is already present in the reference position and additionally calculating also the reference geometric transformation, similarly to what has been said previously, to perform monitoring of the positioning of the optical assembly. In the operating step, the method then inspects the first elongated element 2 in the first position, the second elongated element 20 in the second position and the ideal elongated element 24 in the reference position by applying respectively the first geometric transformation to the first elongated element 2, the second geometric transformation to the second elongated element 20 and the reference geometric transformation to the ideal elongated element 24, if present.

It is added that the first geometric transformation, the second geometric transformation and the reference geometric transformation can be modified or partially corrected during the operating step of the inspection method, when a warning is generated, to incorporate the variations of the geometry of the optical assembly.

For example, at the moment in which a defect is recorded during the inspection, the reference geometric transformation can be calculated and considered valid also for the first and the second geometric transformation, at least until the intervention of an operator. Although the precision is lost that arises from the use of a different geometric transformation for each position, the validity of the processing is ensured even in the presence of a different arrangement of the inspection group 1 during the operating step.

The inspection method 1 is thus able to configure itself, in the event of a defect, ensuring the validity of the inspection, until a subsequent intervention of an operator.

For the reconstruction of the second closed curved profile 35 and for the reconstruction of the closed curved profile 36 of the ideal elongated element 24 what was said previously with regard to the reconstruction of the first closed curved profile 12 of the first elongated element 2, as shown in FIG. 17, remains valid.

As shown in FIG. 17, the first identified curved line 7', 25' and 21' of the respective elongated element 2, 24 and 20 is arranged facing the second identified curved line 10', 27', 23', which is rotated or overturned by 180°, and a first geometric transformation is applied to the first pair of identified curved lines 7', 10', a second geometric transformation to the second pair of identified curved lines 21', 23' and a reference geometric transformation to the third pair of identified curved lines 25' and 27' to obtain respectively the first pair of perspectively corrected curved lines 7", 10", the second pair of perspectively corrected curved lines 21", 23" and third pair of perspectively corrected curves 25" and 27" from which it is possible to reconstruct the first closed curved section profile 12, the second closed curved section profile 35 and the ideal section profile 36.

The inspection group and the inspection method disclosed here enable a section profile of the elongated element to be obtained simply and cheaply, for example the tobacco rod, from which it is possible to calculate a diameter of the rod and also to check possible deformations with respect to an ideal shape, for example a circular shape.

It should be further noted that the inspection portion could coincide with a cross section of the elongated element, performed for example with a plane that is perpendicular to the longitudinal axis of the elongated element, and the first view and the second view could be acquired simultaneously, or almost.

The frequency of inspection or in other words the distance between two subsequent inspections thus depends exclusively on the frequency of acquisition of images of the optical apparatus, which is then selected suitably to ensure the maximum possible number of inspections.

Typically, with the best, i.e. with the most efficient optical apparatuses currently available commercially, an inspection is conducted every 30 mm, preferably every 45 mm, even more preferably every 60 mm or every 5 msec, preferably every 7.5 msec or even more preferably every 10 msec.

It has been said previously that, to prevent disturbing acquisition, the first stripe of light 5, lying on the same plane of the second stripe of light 9, can be optionally emitted at a distance of time from the second stripe of light 9 and thus the inspection portion 6 can extend in a non-nil portion of the elongated element, or similarly the first stripe of light 5 and the second stripe of light 9 can lie on different planes and thus be emitted simultaneously but at a non-nil distance from one another.

In both cases, we wish to emphasise that the inspection portion 6 is so reduced that high precision is ensured in the inspection itself inasmuch as the section profile of the elongated element is reconstructed with partial views of sections of continuous rod that are near one another.

It is added that the optical assembly is very compact. If the inspection group 1 is installed in a forming machine for forming a continuous rod of cigarette, the compactness of the optical assembly enables the optical assembly to be positioned alongside other control devices for controlling the continuous rod, for example a control device for controlling the weight and this ensures the possibility of having a high number of controls of the continuous rod and thus a high quality in the product intended for the consumer.

Still more advantageously, in a double-rod machine, i.e. in a machine that simultaneously forms two rods of cigarettes that are alongside one another, it should be noted that the optical assembly remains unvaried with respect to the optical assembly that is usable to inspect a single continuous rod, inasmuch as the inspection group 1 can inspect without modifications one, two or three elongated elements that are alongside one another.

Owing to the disclosed inspection method of the present invention that permits simultaneous inspection of the first elongated element and of the ideal elongated element, the positioning of the optical assembly during operation of the inspection group can be monitored, which ensures correctness of the inspection over time.

In the event of a defect, in the reference arrangement of the inspection group a warning can be generated to request the intervention of an operator and perform a new calibration of the inspection group.

Advantageously, alternatively, owing to the fact that the reconstruction of the closed section profile of the first elongated element 2 and of the ideal elongated element 24 is performed by using respectively a first geometric transformation and a reference geometric transformation that are calculated in a calibration step of the inspection method and are not pre-set, it is possible to use the reference geometric transformation calculated at the moment of detecting the defect also as a first geometric transformation or update or correct partially the first geometric transformation, to auto-configure in this manner the inspection method without need for an immediate intervention by an operator.

If the reconstructed closed curved profile of the ideal elongated element 24 is different from the ideal section profile, using for the first elongated element 2 and for the ideal elongated element 24 the same reference geometric transformation, an auto-configuration step can thus be provided.

According to a different embodiment of the inspection group 1, shown in FIGS. 11-14, according to the present invention, the projecting device of the first stripe of light 5 and of the second stripe of light 9 comprises a single projector 28.

The projecting device comprises the single projector 28 of a single stripe of light 29 and a shield 30, arranged between the single projector 28 and the elongated element 2. The shield 30 is adapted to divide the single stripe of light 29 into a first portion of the stripe of light 29a and into a second portion of the stripe of light 29b.

The projecting device further comprises first deflectors 31 of the first portion of the stripe of light 29a, for example a mirror, arranged in the first half-space 3 and second deflectors 32 of the second portion of the stripe of light 29b, for example a further mirror, arranged in the second half-space, which are adapted to obtain respectively the first stripe of light 5 projected from the first half-space 3 and the second stripe of light 9 projected from second half-space 4 from the single stripe of light 29.

In other words, the shield 30 cooperates with the first deflectors 31 and the second deflectors 32, which deflect respectively the first portion of the stripe of light 29a and the second portion of the stripe of light 29b towards the first elongated element 2 and the respective stripes of light that are thus projected onto the first elongated element 2 are precisely the first stripe of light 5 and the second stripe of light 9.

The shield 30 is arranged perpendicularly to the working plane P and is arranged such that the single stripe of light 29 is perpendicular to the working plane P. The dimension of the shield 30 and/or the position of the shield 30 with respect to the first elongated element 2 and with respect to the single projector 28 is such as to enable the first elongated element 2 to be illuminated exclusively by the first stripe of light 5 and by the second stripe of light 9, without the first stripe of light 5 or the second stripe of light 9, obtained respectively by deflecting the first part of the stripe of light 29a and the second portion of the stripe of light 29b, being reflected further after intercepting the external face 8 of the first elongated element 2, i.e. in other words without a second reflection.

Owing to the shield 30, to the dimension of the shield 30 and/or to the position of the shield 30, the first elongated element 2 is not illuminated directly by the single stripe of light 29 but only by the first stripe of light 5 and by the second stripe of light 9.

It should be noted that the first deflectors 31 and the second deflectors 32 lie on respective planes that are incident, tilted and symmetrical with respect to the working plane P, which form an angle of 90° (or alternatively an angle of not less than 90°), which intersect on a straight line I parallel to the longitudinal axis S' of the first elongated element 2, which also lies on the working plane P and is further arranged opposite the first elongated element 2 with respect to the shield 30.

Figure 11:
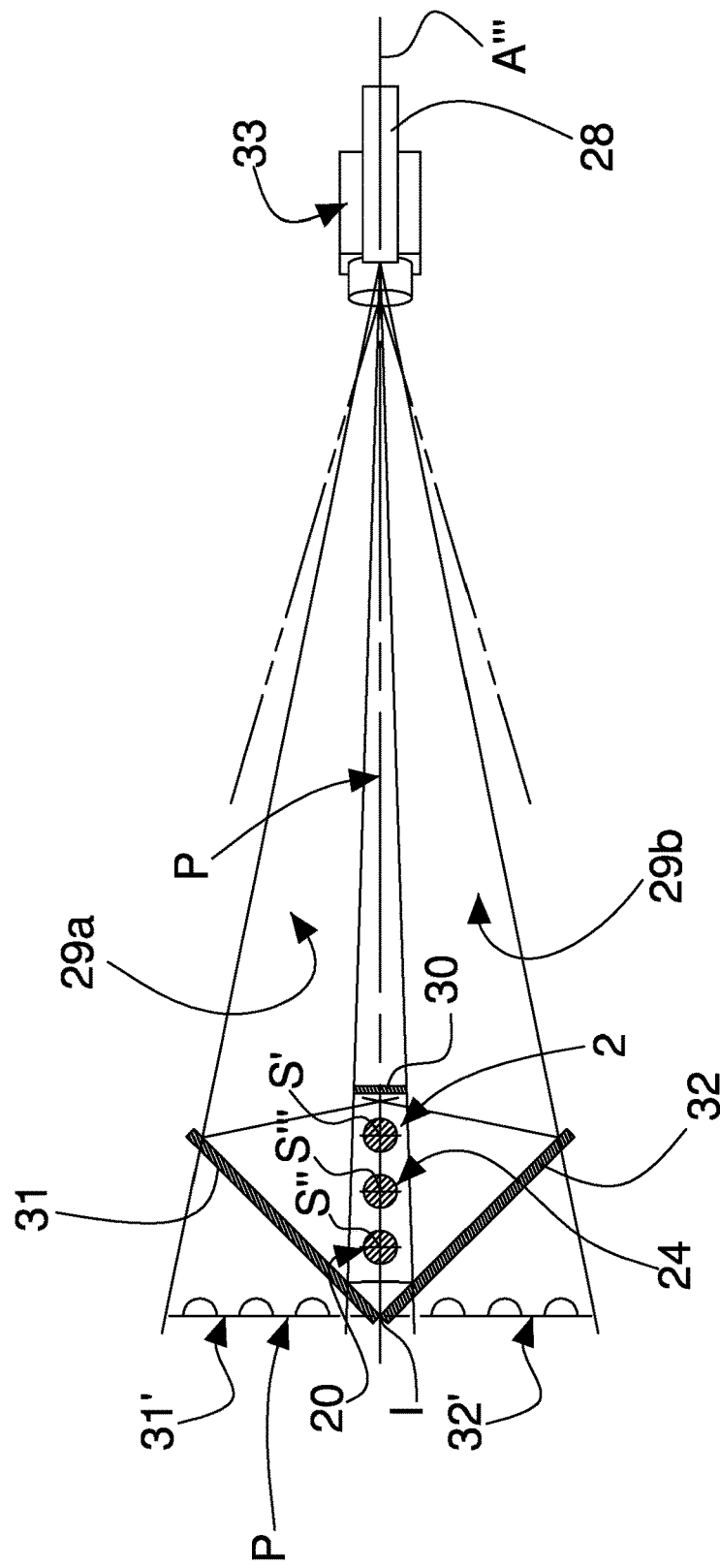
FIG. 11 shows a section view of an embodiment of the inspection group of FIG. 4, made according to the present invention, along a plane that is transverse to a first elongated element, to a second elongated element and to an ideal elongated element, in which the inspection group comprises a projecting device comprising a single projector of a single stripe of light, a shield to split the single stripe of light in a first portion of the stripe of light and into a second portion of the stripe of light, first deflectors of the first portion of the stripe of light and second deflectors of the second portion of the stripe of light and in which the inspection group further comprises an optical assembly comprising a single optical apparatus.
Figure 12:
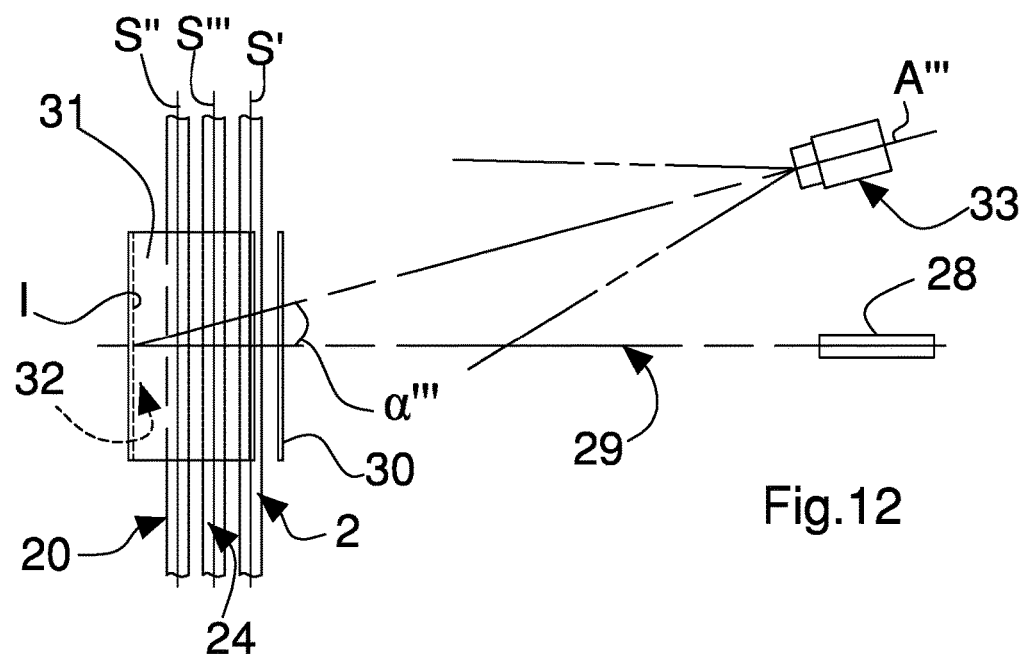
FIG. 12 shows a schematic top view of the inspection group of FIG. 11 made according to the present invention.

It is pointed out that it is not necessary for the first deflectors 31 and the second deflectors 32 to be in contact, as shown in FIG. 11.

According to one version that is not shown, the first deflectors 31 and the second deflectors 32 are symmetrical but at a non-nil distance from the straight line I.

The optical assembly comprises a single 3D profile optical apparatus 33, having an optical axis A''', by means of which the first elongated element 2 is framed. The same considerations apply to the single 3D profile optical apparatus 33 in relation to the configuration specifications made previously in relation to the first optical apparatus 15 and to the second optical apparatus 16, which are not repeated here for the sake of brevity.

The first deflectors 31 are adapted to generate further a respective first virtual mirror view 31' of the first view and the second deflectors 32 are adapted to generate a respective second virtual mirror view 32' of the second view, the single optical apparatus 33 being adapted to acquire, in a single image both the first view received from the first deflectors 31 of the first part of the stripe of light 29a and the second view received from the second deflectors 32 of the second part of the stripe of light 29b. The first deflectors 31 and the second deflectors 32 are thus adapted to generate a reflected working plane P'.

Let it be understood that also for this different embodiment, the single optical apparatus 33 has to be arranged tilted with respect to the first stripe of light 5 and to the second stripe of light 9 also in the presence of the first deflectors 31 and of the second deflectors 32 and a third angle α''' has to be present between the optical axis A''' of the single optical apparatus 33 with respect respectively to the first deflectors 31 and to the second deflectors 32 and the respective stripe of light 5, 9.

Figure 13:
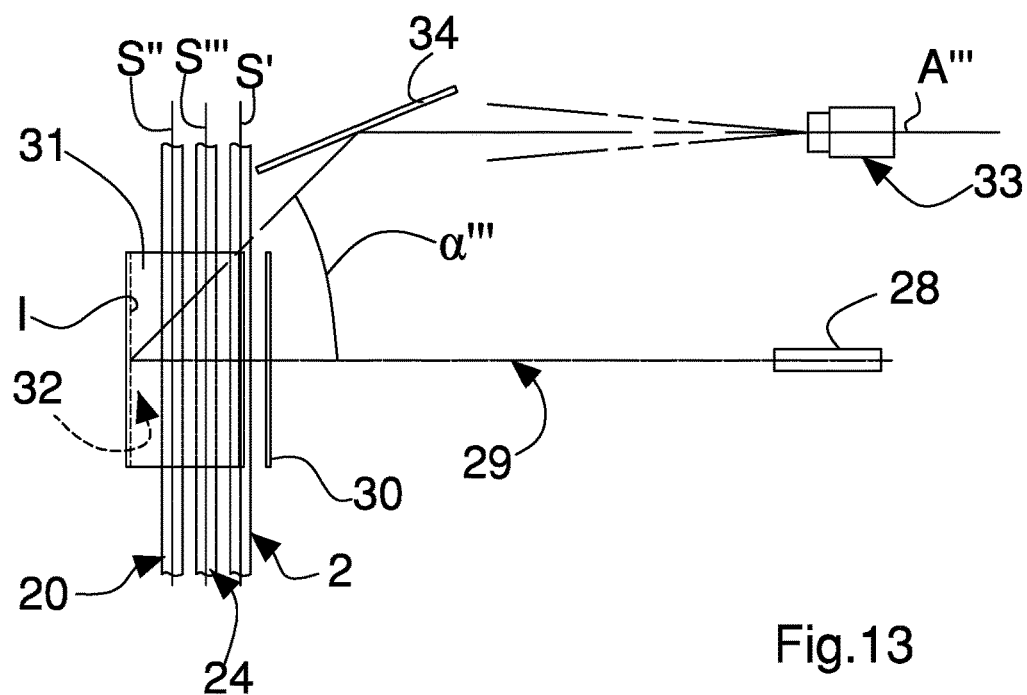
FIG. 13 shows a version of the inspection group of FIG. 11, comprising respective deflectors of the first view and of the second view such that the single optical apparatus can acquire the first view and the second view however the single optical apparatus is arranged with respect to the first elongated element, to the second elongated element and to the ideal elongated element.

Optionally, according to one version illustrated in FIG. 13, the optical assembly further comprises a deflector of the first and second view 34, for example a mirror, adapted to generate a respective further virtual mirror plane of the first view and of the second view such that the single optical apparatus 33 can acquire the first view and the second view as received from the deflector 34, however the single optical apparatus 33 is arranged with respect to the first elongated element 2.

Also the deflector of the first and second view 34, like the deflector of the first view 19 and/or second view disclosed previously, can be used to position in an appropriate manner in space the single optical apparatus 33 with respect to the mechanical members of the machine for tobacco as said previously and thus to ensure correct acquisition of the first view and of the second view also in the presence of problems of overall dimensions that are not otherwise solvable.

Also in this embodiment, similarly to the preceding embodiment, the inspection group 1 is adapted to inspect the first elongated element 2, optionally a second elongated element 20 and a third elongated element, which is the ideal elongated element 24, for inspecting simultaneously the first elongated element 2, optionally the second elongated element 20, and monitoring possible defects in the positioning of the optical assembly, by inspecting the ideal elongated element 24, similarly to what has been illustrated previously.

If the aforesaid elongated elements 2, 20 and 24 are inspected, the elongated elements 2, 20 and 24 are arranged parallel to one another and have respective longitudinal axes S', S'', S''', preferably parallel to one another that lie in the working plane P.

The straight line I in which the plane in which the first deflectors 31 lie and the plane in which the second deflectors 32 lie is arranged on opposite parts of the elongated elements 2, 20 and 24 with respect to the shield 30.

In use, when the inspection group 1 receives an inspection start command, a single stripe of light 29 is generated by a single projector 28 of a projecting device and a shield 30 is provided between an elongated element 2 and the single stripe of light 29 so as to divide the single stripe of light 29 into a first portion of the stripe of light 29a and into a second portion of the stripe of light 29b.

By providing the first deflectors 31 of the first portion of the stripe of light 29a in the first half-space 3 and second deflectors 32 of the second portion of the stripe of light 29b in the second half-space 4, from the single stripe of light 29 by deflecting the single stripe of light 29, a first stripe of light 5 is obtained, that from the first half-space 3 on an inspection portion 6 of the first elongated element 2 projects a first three-dimensional light trace 7 onto an external face 8 of the first elongated element 2. From the single stripe of light 29 also a second stripe of light 9 is further obtained that from the second half-space 4 on the inspection portion 6 projects a second three-dimensional light trace 10 onto the external face 8.

A single 3D profile optical apparatus 33 of the optical assembly is further provided that is adapted to acquire, in a single image both the first view from the first deflectors 31 and the second view from the second deflectors 32, the first deflectors 31 being adapted to generate a respective first virtual mirror view 31' of the first view and the second deflectors 32 being adapted to generate a respective second virtual mirror view 32' of the second view. In this manner, in a single image, the first view is acquired from the first half-space 3 and the second view from the second half-space 4, opposite the first half-space 3, by the first virtual mirror view 31' and by the second virtual mirror view 32'.

With regard to the reconstruction of a first closed curved section profile 12 of the first elongated element 2, what has been said before applies, i.e. the first identified curved line 7' is processed in the first view and the second identified curved line 10' is processed in the second view, as shown in FIG. 17.

Also in this embodiment of the inspection group according to the present invention, the first elongated element 2, a second elongated element 20 and the third elongated element, which is the ideal elongated element 24, are inspected to monitor possible defects in the positioning of the optical assembly, as illustrated previously.

The processing means can thus reconstruct a closed curved section profile 36 of the ideal elongated element 24 and optionally also a second closed curved section profile 35 of the second elongated element 20, and check positioning of the optical assembly by the ideal elongated element 24, as indicated previously.

Also for this embodiment of a single optical apparatus 33 and single stripe of light 29, calculating in a calibration step is provided, preceding the operating step, the first geometric transformation for the first elongated element 2 arranged in the first position, the reference geometric transformation for the ideal elongated element 24 arranged in the reference position and optionally the second geometric transformation for the second elongated element 20 arranged in the second position, as illustrated above.

This embodiment of the inspection group 1 is particularly advantageous.

First of all, the inspection group 1 is still more compact than the preceding embodiment, as the projecting device comprises only the single projector 28, the shield 30, the first deflectors 31, the second deflectors 32, the optical assembly comprising the single optical apparatus 33. Further, in a single image and thus at the same moment the acquisition of the first and of the second view of the first elongated element 2 or of the second elongated element 20 and/or of the ideal elongated element 24 is ensured, which are respectively framed by the first half-space 3 and by the second half-space 4.

The inspection portion coincides with the cross section of the first elongated element 2, of the second elongated element 20 or of the ideal elongated element 24, performed with a plane perpendicular to the longitudinal axis of the elongated elements that coincides with the emission plane of the single stripe of light 29 and thus the inspection frequency is greatest and is determined only by the acquisition speed of the single optical apparatus 33.

Further, having in a single image both the first view and the second view, by means of the first virtual mirror view 31' and the second virtual mirror view 32', ensures that the first three-dimensional light trace 7, 21, 25 and the second three-dimensional light trace 10, 23, 27 are acquired with the acquisition parameters that are those of the single optical apparatus 33, for example the zoom, focusing and the objective-configuring diaphragm aperture.

The angle α''' is further defined both between the first stripe of light 5 and the optical axis A''' of the single optical apparatus 33 in the first half-space 3 and between the second stripe of light 9 and the optical axis A''' in the second half-space 4.

Owing to the presence of a single optical apparatus 33, great precision can be obtained in the reconstruction of the closed curved profile of each elongated element 2, 20 and of the ideal elongated element 24 if present, inasmuch as the first view and the second view are framed respectively by the first half-space 3 and by the second half-space 4 in the same manner, with the angle of acquisition and with the same single optical apparatus 33.

If between the first deflectors 31 and the second deflectors 32 an angle of 90° is defined, two opposite faces are framed simultaneously of the elongated element 2 and thus when they are arranged facing each other the first identified curved line 7', 25' and 21' of light and the second identified curved line 10', 27' and 23' of light, the latter rotated or overturned by 180° to reconstruct the corresponding closed curved section profile 12, 35 and 36, this rotation aligns curved lines arising from the same section of the elongated element 2, 20 or 24. In other words, identified curved lines are arranged facing each other that correspond to half profiles of the elongated element, so there is the assurance of the arrangement at 180° from one another, i.e. on opposite faces.

The invention claimed is:

1. An inspection group of cylinder-shaped elongated elements for smoking articles, in which the inspection group comprises:
    a projecting device adapted to project: a first stripe of light from a first half space onto an inspection portion of an external face of a first elongated element to obtain a first three-dimensional light trace on said external face; a second stripe of light from a second half-space on said inspection portion to obtain a second three-dimensional light trace on said external face; and in which the first half space and the second half space are arranged on opposite parts with respect to a working plane passing through a longitudinal axis of the first elongated element;
    an optical assembly adapted to process: a first view of the first elongated element framed by the first half space to identify a first curved line; a second view of the first elongated element framed by the second half space to identify a second curved line;
    a processing device adapted to reconstruct a first closed curved section profile of the first elongated element, processing the first identified curved line and the second identified curved line, and comparing the reconstructed first closed curved section profile with the ideal section profile;
    wherein the projecting device includes:
        a single projector of a single stripe of light;
        a shield arranged between the single projector and the first elongated element, adapted to split the single stripe of light into a first portion of the stripe of light and into a second portion of the stripe of light; and
        first deflectors of the first portion of the stripe of light arranged in the first half-space and second deflectors of the second portion of the stripe of light arranged in the second half-space to obtain respectively the first stripe of light projected from the first half-space and the second stripe of light projected from the second half-space from the single stripe of light;
    wherein the optical assembly further includes a single optical apparatus for a 3D profile, and wherein further the first deflectors are adapted to generate a respective first virtual mirror view of the first view and the second deflectors are adapted to generate a respective second virtual mirror view of the second view, the single optical apparatus being adapted to acquire in a single image both the first view from the first deflectors and the second view from the second deflectors.

2. The inspection group according to claim 1, wherein the shield is arranged perpendicularly to the working plane, the dimension of the shield and/or the position of the shield with respect to the first elongated element and with respect to the single projector being such as to enable the first elongated element to be lighted exclusively by the first blade of light and by the second blade of light without reflected light.

3. The inspection group according to claim 2, wherein the first deflectors and the second deflectors are tilted and symmetrical with respect to the working plane and lie on respective incident planes, which intersect in a straight line, which is parallel to the longitudinal axis of the first elongated element and lies in the working plane.

4. The inspection group according to claim 2, wherein the optical assembly further includes a single optical apparatus for a 3D profile and wherein further the first deflectors are adapted to generate a respective first virtual mirror view of the first view and the second deflectors are adapted to generate a respective second virtual mirror view of the second view, the single optical apparatus being adapted to acquire in a single image both the first view from the first deflectors and the second view from the second deflectors.

5. The inspection group according to claim 2, in which the inspection group is adapted to inspect simultaneously the first elongated element and a second elongated element, the first elongated element and the second elongated element being arranged alongside one another respectively in a first position and in a second position such that a longitudinal axis of the first elongated element and a longitudinal axis of the second elongated element are both arranged in the working plane; the projecting device being adapted to additionally project the first stripe of light from the first half-space onto an external face of the second elongated element to obtain a first three-dimensional light trace and the second stripe of light from the second half-space on said external face to obtain a second three-dimensional light trace; the optical assembly being adapted to simultaneously frame from the first half space the first elongated element and the second elongated element to process the first view and additionally identify a first curved line of the second elongated element and frame simultaneously from the second half space the first elongated element and the second elongated element to process the second view and additionally identify a second curved line of the second elongated element; and in which the processing device is adapted to additionally reconstruct a second closed curved section profile of the elongated second element by processing the identified first curved line and the identified second curved line and compare the second closed curved section profile with the ideal section profile to identify additionally possible deformations of the second closed curved section profile with respect to the ideal section profile.

6. The inspection group according to claim 2, wherein the inspection group is adapted to inspect simultaneously the first elongated element and an ideal elongated element, the first elongated element and the ideal elongated element being arranged alongside one another respectively in a first position and in a reference position in such a manner that a longitudinal axis of the first elongated element and a longitudinal axis of the ideal elongated element are both arranged in the working plane; the projecting device being adapted to additionally project the first stripe of light from the first half space onto an external face of the ideal elongated element to obtain a first three-dimensional light trace and the second stripe of light from the second half space onto said external face to obtain a second three-dimensional light trace; the optical assembly being adapted to frame simultaneously from the first half space the first elongated element and the ideal elongated element for processing the first view and additionally identifying a first curved line of the ideal elongated element; and to frame simultaneously from the second half space the first elongated element and the ideal elongated element to process the second view and additionally identifying a second curved line of the ideal elongated element; and in which the processing device is adapted to additionally reconstruct a closed curved section profile of the ideal elongated element by processing the identified first curved line and the second identified curved line and monitor the reconstructed closed curved section profile of the ideal elongated element, generating a warning if the reconstructed closed curved section profile of the ideal elongated element is different from the ideal section profile.

7. The inspection group according to claim 1, wherein the first deflectors and the second deflectors are tilted and symmetrical with respect to the working plane and lie on respective incident planes, which intersect in a straight line, which is parallel to the longitudinal axis of the first elongated element and lies in the working plane.

8. The inspection group according to claim 1, and wherein the optical assembly includes a deflector of the first view and of the second view that is adapted to generate a respective virtual mirror plane of the first view and of the second view in such a manner that the single optical apparatus can acquire the first view and the second view from said deflector, however the single optical apparatus is arranged with respect to the first elongated element.

9. The inspection group according to claim 1, in which the inspection group is adapted to inspect simultaneously the first elongated element and a second elongated element, the first elongated element and the second elongated element being arranged alongside one another respectively in a first position and in a second position such that a longitudinal axis of the first elongated element and a longitudinal axis of the second elongated element are both arranged in the working plane; the projecting device being adapted to additionally project the first stripe of light from the first half-space onto an external face of the second elongated element to obtain a first three-dimensional light trace and the second stripe of light from the second half-space on said external face to obtain a second three-dimensional light trace; the optical assembly being adapted to simultaneously frame from the first half space the first elongated element and the second elongated element to process the first view and additionally identify a first curved line of the second elongated element and frame simultaneously from the second half space the first elongated element and the second elongated element to process the second view and additionally identify a second curved line of the second elongated element; and in which the processing device is adapted to additionally reconstruct a second closed curved section profile of the elongated second element by processing the identified first curved line and the identified second curved line and compare the second closed curved section profile with the ideal section profile to identify additionally possible deformations of the second closed curved section profile with respect to the ideal section profile.

10. The inspection group according to claim 9, wherein an ideal elongated element, the first elongated element and the second elongated element are arranged parallel to one another respectively in a reference position, in the first position and in the second position; and wherein the optical assembly is adapted to frame simultaneously respectively in the first view from the first half space and in the second view from the second half space, the first elongated element in the first position, the second elongated element in the second position and the ideal elongated element in the reference position.

11. The inspection group according to claim 1, wherein the inspection group is adapted to inspect simultaneously the first elongated element and an ideal elongated element, the first elongated element and the ideal elongated element being arranged alongside one another respectively in a first position and in a reference position in such a manner that a longitudinal axis of the first elongated element and a longitudinal axis of the ideal elongated element are both arranged in the working plane; the projecting device being adapted to additionally project the first stripe of light from the first half space onto an external face of the ideal elongated element to obtain a first three-dimensional light trace and the second stripe of light from the second half space onto said external face to obtain a second three-dimensional light trace; the optical assembly being adapted to frame simultaneously from the first half space the first elongated element and the ideal elongated element for processing the first view and additionally identifying a first curved line of the ideal elongated element; and to frame simultaneously from the second half space the first elongated element and the ideal elongated element to process the second view and additionally identifying a second curved line of the ideal elongated element; and in which the processing device is adapted to additionally reconstruct a closed curved section profile of the ideal elongated element by processing the identified first curved line and the second identified curved line and monitor the reconstructed closed curved section profile of the ideal elongated element, generating a warning if the reconstructed closed curved section profile of the ideal elongated element is different from the ideal section profile.

12. The inspection group according to claim 11, wherein the ideal elongated element, the first elongated element and the second elongated element are arranged parallel to one another; and wherein the optical assembly is adapted to frame simultaneously respectively in the first view from the first half space and in the second view from the second half space, the first elongated element in the first position, the second elongated element in the second position and the ideal elongated element in the reference position.

13. An inspection group of cylinder-shaped elongated elements for smoking articles, in which the inspection group comprises:
   a projecting device adapted to project: a first stripe of light from a first half space onto an inspection portion of an external face of a first elongated element to obtain a first three-dimensional light trace on said external face; a second stripe of light from a second half-space on said inspection portion to obtain a second three-dimensional light trace on said external face; and in which the first half space and the second half space are arranged on opposite parts with respect to a working plane passing through a longitudinal axis of the first elongated element;
   an optical assembly adapted to process: a first view of the first elongated element framed by the first half space to identify a first curved line; a second view of the first elongated element framed by the second half space to identify a second curved line;
   a processing device adapted to reconstruct a first closed curved section profile of the first elongated element, processing the first identified curved line and the second identified curved line, and comparing the reconstructed first closed curved section profile with an ideal section profile; wherein the projecting device includes:
      a first projector adapted to project a first stripe of light from the first half space;
      a second projector adapted to project a second stripe of light from the second half space;
   wherein the optical assembly includes:
   a first optical apparatus adapted to acquire a first image of the first view;
   a second optical apparatus adapted to acquire a second image of the second view;
   a first deflector of the first view arranged to generate a virtual mirror plane of the first view such that the first optical apparatus adapted to acquire the first image of the first view from the first deflector regardless of the arrangement of the first optical apparatus.

14. The inspection group according to claim 13, and further including a second deflector of the of the second view arranged to generate a virtual mirror plane of the second view such that the second optical apparatus may acquire the second image of the second view from the second deflector regardless of the arrangement of the second optical apparatus.

15. The inspection group according to claim 13, in which the inspection group is adapted to inspect simultaneously the first elongated element and a second elongated element, the first elongated element and the second elongated element being arranged alongside one another respectively in a first position and in a second position such that a longitudinal axis of the first elongated element and a longitudinal axis of the second elongated element are both arranged in the working plane; the projecting device being adapted to additionally project the first stripe of light from the first half-space onto an external face of the second elongated element to obtain a first three-dimensional light trace and the second stripe of light from the second half-space on said external face to obtain a second three-dimensional light trace; the optical assembly being adapted to simultaneously frame from the first half space the first elongated element and the second elongated element to process the first view and additionally identify a first curved line of the second elongated element and frame simultaneously from the second half space the first elongated element and the second elongated element to process the second view and additionally identify a second curved line of the second elongated element; and in which the processing device is adapted to additionally reconstruct by processing the identified first curved line and the identified second curved line a second closed curved section profile of the elongated second element and compare the second closed curved section profile with the ideal section profile to identify additionally possible deformations of the second closed curved section profile with respect to the ideal section profile.

16. The inspection group according to claim 15, wherein an ideal elongated element, the first elongated element and the second elongated element are arranged parallel to one another respectively in a reference position, in the first position and in the second position; and wherein the optical assembly is adapted to frame simultaneously respectively in the first view from the first half space and in the second view from the second half space, the first elongated element in the first position, the second elongated element in the second position and the ideal elongated element in the reference position.

17. The inspection group according to claim 13, wherein the inspection group is adapted to inspect simultaneously the first elongated element and an ideal elongated element, the first elongated element and the ideal elongated element being arranged alongside one another respectively in a first position and in a reference position in such a manner that a longitudinal axis of the first elongated element and a longitudinal axis of the ideal elongated element are both arranged in the working plane; the projecting device being adapted to additionally project the first stripe of light from the first half space onto an external face of the ideal elongated element to obtain a first three-dimensional light trace and the second stripe of light from the second half space onto said external face to obtain a second three-dimensional light trace; the optical assembly being adapted to frame simultaneously from the first half space the first elongated element and the ideal elongated element for processing the first view and additionally identifying a first curved line of the ideal elongated element; and to frame simultaneously from the second half space the first elongated element and the ideal elongated element to process the second view and additionally identifying a second curved line of the ideal elongated element; and in which the processing device is adapted to additionally reconstruct by processing the identified first curved line and the second identified curved line a closed curved section profile of the ideal elongated element and monitoring the reconstructed closed profile of the ideal elongated element, generating a warning if the reconstructed curved profile of the ideal elongated element is different from the ideal section profile.

18. The inspection group according to claim 17, wherein the ideal elongated element, the first elongated element and the second elongated element are arranged parallel to one another; and wherein the optical assembly is adapted to frame simultaneously respectively in the first view from the first half space and in the second view from the second half space, the first elongated element in the first position, the second elongated element in the second position and the ideal elongated element in the reference position.

* * * * *